United States Patent
Hensgen et al.

(10) Patent No.: US 9,525,839 B2
(45) Date of Patent: *Dec. 20, 2016

(54) SYSTEMS AND METHODS FOR PROVIDING A MULTI-PERSPECTIVE VIDEO DISPLAY

(71) Applicant: OpenTV, Inc., San Francisco, CA (US)

(72) Inventors: Debra Hensgen, San Jose, CA (US); Ludovic Pierre, Paris (FR)

(73) Assignee: OpenTV, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/479,077

(22) Filed: Sep. 5, 2014

(65) Prior Publication Data

US 2014/0375885 A1  Dec. 25, 2014

Related U.S. Application Data

(63) Continuation of application No. 13/589,589, filed on Aug. 20, 2012, now Pat. No. 8,832,756, which is a
(Continued)

(51) Int. Cl.
*H04N 7/173* (2011.01)
*H04N 5/45* (2011.01)
(Continued)

(52) U.S. Cl.
CPC .................. *H04N 5/45* (2013.01); *H04N 5/76* (2013.01); *H04N 7/163* (2013.01);
(Continued)

(58) Field of Classification Search
CPC .................. H04N 21/47214; H04N 21/47202; H04N 21/812; H04N 21/6125; H04N 7/17318; H04N 7/17336
(Continued)

(56) References Cited

U.S. PATENT DOCUMENTS 4,656,527 A  4/1987  Uchimi
4,847,698 A  7/1989  Freeman
(Continued)

FOREIGN PATENT DOCUMENTS

AU  770163 B2  2/2004
AU  2001266732 B2  5/2007
(Continued)

OTHER PUBLICATIONS

"U.S. Appl. No. 09/630,646, Advisory Action mailed Sep. 13, 2002", 4 pgs.
(Continued)

*Primary Examiner* — Annan Shang
(74) *Attorney, Agent, or Firm* — Schwegman Lundberg & Woessner, P.A.

(57) ABSTRACT

Methods and systems for providing media content including multiple audio perspectives are presented. In one example, a media content item that includes a plurality of audio perspectives is accessed. The visual content and a first one of the plurality of audio perspectives are provided for presentation to the user. In response to one or more user commands, the visual content may be provided for presentation with a second one of the plurality of audio perspectives.

19 Claims, 10 Drawing Sheets

Related U.S. Application Data continuation of application No. 09/765,965, filed on Jan. 19, 2001, now Pat. No. 8,250,617.

(60) Provisional application No. 60/235,529, filed on Sep. 26, 2000.

(51) Int. Cl.

| | | |
|---|---|---|
| *H04N 5/76* | (2006.01) | |
| *H04N 7/16* | (2011.01) | |
| *H04N 21/218* | (2011.01) | |
| *H04N 21/235* | (2011.01) | |
| *H04N 21/43* | (2011.01) | |
| *H04N 21/431* | (2011.01) | |
| *H04N 21/433* | (2011.01) | |
| *H04N 21/4335* | (2011.01) | |
| *H04N 21/434* | (2011.01) | |
| *H04N 21/435* | (2011.01) | |
| *H04N 21/439* | (2011.01) | |
| *H04N 21/81* | (2011.01) | |
| *H04N 21/8545* | (2011.01) | |
| *H04N 9/82* | (2006.01) | |

(52) U.S. Cl.
CPC ..... *H04N 21/21805* (2013.01); *H04N 21/235* (2013.01); *H04N 21/435* (2013.01); *H04N 21/4305* (2013.01); *H04N 21/439* (2013.01); *H04N 21/4316* (2013.01); *H04N 21/4331* (2013.01); *H04N 21/4334* (2013.01); *H04N 21/4335* (2013.01); *H04N 21/4345* (2013.01); *H04N 21/4349* (2013.01); *H04N 21/4351* (2013.01); *H04N 21/8166* (2013.01); *H04N 21/8545* (2013.01); *H04N 9/8227* (2013.01)

(58) Field of Classification Search
USPC ...... 725/43–61, 87–118, 131–134, 139–142, 725/151–153; 709/217–232
See application file for complete search history.

(56) References Cited

U.S. PATENT DOCUMENTS

| | | | |
|---|---|---|---|
| 4,847,699 A | 7/1989 | Freeman | |
| 4,847,700 A | 7/1989 | Freeman | |
| 4,918,516 A | 4/1990 | Freeman | |
| 5,068,733 A | 11/1991 | Bennett | |
| 5,213,156 A * | 5/1993 | Eriksson | F28D 7/024 165/158 |
| RE34,340 E | 8/1993 | Freeman | |
| 5,282,092 A | 1/1994 | Wilhelms | |
| 5,333,135 A | 7/1994 | Wendorf | |
| 5,371,551 A | 12/1994 | Logan et al. | |
| 5,381,275 A | 1/1995 | Nitta | |
| 5,539,920 A | 7/1996 | Menand et al. | |
| 5,555,463 A | 9/1996 | Staron | |
| 5,574,845 A * | 11/1996 | Benson et al. | 345/418 |
| 5,600,368 A | 2/1997 | Matthews, III | |
| 5,613,032 A | 3/1997 | Cruz et al. | |
| 5,640,453 A | 6/1997 | Schuchman et al. | |
| 5,724,091 A | 3/1998 | Freeman et al. | |
| 5,729,471 A | 3/1998 | Jain et al. | |
| 5,797,001 A | 8/1998 | Augenbraun et al. | |
| 5,861,881 A | 1/1999 | Freeman et al. | |
| 5,903,816 A | 5/1999 | Broadwin et al. | |
| 5,926,205 A | 7/1999 | Krause | |
| 5,926,821 A | 7/1999 | Hirose et al. | |
| 5,956,088 A | 9/1999 | Shen et al. | |
| 5,995,705 A | 11/1999 | Lang | |
| 5,996,089 A | 11/1999 | Mann | |
| 5,999,698 A | 12/1999 | Nakai et al. | |
| 6,008,867 A | 12/1999 | Cooper et al. | |
| 6,029,045 A | 2/2000 | Picco et al. | |
| 6,046,818 A * | 4/2000 | Benson | G06F 17/217 358/1.1 |
| 6,065,050 A | 5/2000 | DeMoney | |
| 6,094,671 A * | 7/2000 | Chase | H04B 7/18578 709/201 |
| 6,144,375 A | 11/2000 | Jain et al. | |
| 6,147,714 A | 11/2000 | Terasawa | |
| 6,177,930 B1 | 1/2001 | Chernock et al. | |
| 6,177,931 B1 | 1/2001 | Alexander et al. | |
| 6,208,383 B1 * | 3/2001 | Park | G09G 5/246 348/461 |
| 6,215,484 B1 | 4/2001 | Freeman et al. | |
| 6,289,165 B1 | 9/2001 | Abecassis | |
| 6,317,885 B1 | 11/2001 | Fries | |
| 6,353,461 B1 | 3/2002 | Shore et al. | |
| 6,360,234 B2 | 3/2002 | Jain et al. | |
| 6,415,438 B1 | 7/2002 | Blackketter et al. | |
| 6,427,238 B1 | 7/2002 | Goodman et al. | |
| 6,430,361 B2 | 8/2002 | Lee | |
| 6,442,538 B1 | 8/2002 | Nojima | |
| 6,480,667 B1 | 11/2002 | O'connor | |
| 6,502,139 B1 | 12/2002 | Birk et al. | |
| 6,529,680 B1 * | 3/2003 | Broberg | H04N 5/765 348/731 |
| 6,536,041 B1 | 3/2003 | Knudson | |
| 6,574,795 B1 | 6/2003 | Carr | |
| 6,611,958 B1 * | 8/2003 | Shintani | H04N 5/44543 348/E5.105 |
| 6,637,032 B1 | 10/2003 | Feinleib | |
| 6,678,463 B1 | 1/2004 | Pierre et al. | |
| 6,704,790 B1 | 3/2004 | Gopalakrishnan | |
| 6,718,551 B1 | 4/2004 | Swix et al. | |
| 6,748,335 B2 | 6/2004 | Pickerd | |
| 6,769,987 B1 | 8/2004 | Morita et al. | |
| 6,934,759 B2 * | 8/2005 | Hejna, Jr. | H04N 21/234381 375/E7.015 |
| 7,000,245 B1 | 2/2006 | Pierre et al. | |
| 7,079,176 B1 | 7/2006 | Freeman et al. | |
| 7,486,926 B2 * | 2/2009 | White | G06Q 30/0267 455/3.05 |
| 7,584,291 B2 * | 9/2009 | McDowall | H04H 20/82 709/231 |
| RE42,320 E * | 5/2011 | Jung | G10H 1/363 369/47.16 |
| 7,949,707 B2 * | 5/2011 | McDowall | H04H 20/77 709/203 |
| 8,250,617 B2 | 8/2012 | Hensgen et al. | |
| 8,528,019 B1 * | 9/2013 | Dimitrova | G06F 17/30787 382/111 |
| 8,610,786 B2 | 12/2013 | Ortiz | |
| 8,832,756 B2 | 9/2014 | Hensgen et al. | |
| 9,043,859 B1 * | 5/2015 | Harvey | G01R 1/071 725/135 |
| 2002/0129374 A1 | 9/2002 | Freeman et al. | |
| 2003/0149988 A1 | 8/2003 | Ellis et al. | |
| 2003/0208771 A1 | 11/2003 | Hensgen et al. | |
| 2012/0314134 A1 | 12/2012 | Hensgen et al. | |

FOREIGN PATENT DOCUMENTS

| | | |
|---|---|---|
| CA | 2417777 A1 | 2/2002 |
| CA | 2398200 A1 | 7/2002 |
| CN | 1428045 A | 7/2003 |
| EP | 0677842 A1 | 10/1995 |
| EP | 0847197 A1 | 6/1998 |
| EP | 0913974 A1 | 5/1999 |
| EP | 0949816 A2 | 10/1999 |
| EP | 1224806 A1 | 7/2002 |
| EP | 1224806 B1 | 11/2003 |
| EP | 1266521 B1 | 8/2007 |
| ES | 1266521 A1 | 12/2002 |
| FR | 1224806 A1 | 7/2002 |
| FR | 1266521 A1 | 12/2002 |
| GB | 1224806 A1 | 7/2002 |
| GB | 1266521 A1 | 12/2002 |
| HK | 1049757 | 5/2003 |
| IT | 1224806 A1 | 7/2002 |
| IT | 1266521 A1 | 12/2002 |

(56) References Cited

FOREIGN PATENT DOCUMENTS

| JP | 10-234006 A | 9/1998 |
|---|---|---|
| JP | 10-234007 A | 9/1998 |
| JP | 10-243348 A | 9/1998 |
| JP | 10-271454 A | 10/1998 |
| JP | 2003513559 A | 4/2003 |
| JP | 2004505554 A | 2/2004 |
| WO | WO-9222983 A2 | 12/1992 |
| WO | WO-9532584 A1 | 11/1995 |
| WO | WO-9836559 A | 8/1998 |
| WO | WO-9853611 A1 | 11/1998 |
| WO | WO-9933265 A1 | 7/1999 |
| WO | WO-0133852 A1 | 5/2001 |
| WO | WO-0211424 A2 | 2/2002 |

OTHER PUBLICATIONS

"U.S. Appl. No. 09/630,646, Corrected Notice of Allowance mailed Oct. 28, 2003", 3 pgs.
"U.S. Appl. No. 09/630,646, Final Office Action mailed Apr. 22, 2002", 10 pgs.
"U.S. Appl. No. 09/630,646, Non Final Office Action mailed Jan. 14, 2003", 4 pgs.
"U.S. Appl. No. 09/630,646, Non Final Office Action mailed Sep. 28, 2001", 8 pgs.
"U.S. Appl. No. 09/630,646, Notice of Allowance mailed Aug. 26, 2003", 5 pgs.
"U.S. Appl. No. 09/630,646, Response filed Apr. 14, 2003 to Non Final Office Action mailed Jan. 14, 2003", 9 pgs.
"U.S. Appl. No. 09/630,646, Response filed Jun. 4, 2003 to Non Final Office Action mailed Apr. 25, 2003", 11 pgs.
"U.S. Appl. No. 09/630,646, Response filed Jul. 17, 2002 to Final Office Action mailed Apr. 22, 2002", 6 pgs.
"U.S. Appl. No. 09/630,646, Response filed Oct. 22, 2002 to Advisory Action mailed Sep. 13, 2002", 11 pgs.
"U.S. Appl. No. 09/630,646, Response filed Dec. 28, 2001 to Non Final Office Action mailed Sep. 28, 2001", 8 pgs.
"U.S. Appl. No. 09/662,949, Final Office Action mailed May 31, 2005", 7 pgs.
"U.S. Appl. No. 09/662,949, Non Final Office Action mailed Jul. 20, 2004", 15 pgs.
"U.S. Appl. No. 09/662,949, Notice of Allowance mailed Aug. 24, 2005", 6 pgs.
"U.S. Appl. No. 09/662,949, Response filed Jul. 26, 2005 to Final Office Action mailed May 31, 2005", 10 pgs.
"U.S. Appl. No. 09/662,949, Response filed Nov. 19, 2004 to Non Final Office Action mailed Jul. 20, 2004", 15 pgs.
"U.S. Appl. No. 09/765,965, Advisory Action mailed Jul. 25, 2006", 3 pgs.
"U.S. Appl. No. 09/765,965, Appeal Brief filed Sep. 10, 2008", 39 pgs.
"U.S. Appl. No. 09/765,965, Corrected Notice of Allowance mailed Aug. 1, 2012", 2 pgs.
"U.S. Appl. No. 09/765,965, Decision on Pre-Appeal Brief Request mailed Jul. 9, 2008", 2 pgs.
"U.S. Appl. No. 09/765,965, Examiner's Answer to Appeal Brief mailed Dec. 3, 2008", 16 pgs.
"U.S. Appl. No. 09/765,965, Final Office Action mailed May 16, 2006", 13 pgs.
"U.S. Appl. No. 09/765,965, Final Office Action mailed May 17, 2005", 16 pgs.
"U.S. Appl. No. 09/765,965, Final Office Action mailed Nov. 1, 2007", 13 pgs.
"U.S. Appl. No. 09/765,965, Non Final Office Action mailed Apr. 16, 2007", 14 pgs.
"U.S. Appl. No. 09/765,965, Non Final Office Action mailed Aug. 12, 2004", 14 pgs.
"U.S. Appl. No. 09/765,965, Non Final Office Action mailed Oct. 31, 2006", 13 pgs.
"U.S. Appl. No. 09/765,965, Non Final Office Action mailed Dec. 9, 2005", 13 pgs.
"U.S. Appl. No. 09/765,965, Notice of Allowance mailed Apr. 16, 2012", 8 pgs.
"U.S. Appl. No. 09/765,965, Pre-Appeal Brief Request filed Apr. 1, 2008", 6 pgs.
"U.S. Appl. No. 09/765,965, Response filed Feb. 1, 2007 to Non Final Office mailed Oct. 31, 2006", 18 pgs.
"U.S. Appl. No. 09/765,965, Response filed Mar. 3, 2006 to Non Final Office Action mailed Dec. 9, 2005", 17 pgs.
"U.S. Appl. No. 09/765,965, Response filed Mar. 21, 2012 to Decision on Appeal mailed Jan. 20, 2012", 15 pgs.
"U.S. Appl. No. 09/765,965, Response filed Jul. 17, 2006 to Final Office Action mailed May 16, 2006", 15 pgs.
"U.S. Appl. No. 09/765,965, Response filed Aug. 15, 2007 to Non Final Office Action mailed Apr. 16, 2007", 19 pgs.
"U.S. Appl. No. 09/765,965, Response filed Aug. 19, 2005 to Final Office Action mailed May 17, 2005", 21 pgs.
"U.S. Appl. No. 09/765,965, Response filed Nov. 16, 2004 to Non Final Office Action mailed Aug. 12, 2004", 13 pgs.
"U.S. Appl. No. 13/589,589, Non Final Office Action mailed Sep. 27, 2013", 13 pgs.
"U.S. Appl. No. 13/589,589, Notice of Allowance mailed Jun. 24, 2014", 9 pgs.
"U.S. Appl. No. 13/589,589, Response filed Feb. 14, 2014 to Non Final Office Action mailed Sep. 27, 2013", 12 pgs.
"Australian Application Serial No. 2001266732, Office Action mailed Mar. 30, 2006", 3 pgs.
"Australian Application Serial No. 2001266732, Office Action mailed Oct. 12, 2006", 3 pgs.
"European Application Serial No. 01944307.6, Decision to Grant Patent mailed Jul. 26, 2007", 2 pgs.
"European Application Serial No. 01944307.6, Office Action mailed Apr. 12, 2005", 1 pg.
"European Application Serial No. 01944307.6, Office Action mailed Sep. 22, 2006", 8 pgs.
"European Application Serial No. 01944307.6, Office Action mailed Oct. 16, 2006", 8 pgs.
"European Application Serial No. 01944307.6, Response filed Aug. 16, 2005", 4 pgs.
"European Application Serial No. 01944307.6, Response filed Sep. 12, 2006 to Office Action mailed Jan. 3, 2006", 11 pgs.
"European Application Serial No. 01944307.6, Supplementary European Search Report mailed Feb. 16, 2005", 3 pgs.
"European Application Serial No. 01944307.6, Summons to Attend Oral Proceedings mailed Jan. 3, 2006", 1 pg.
"European Application Serial No. 974109.1, Decision to Grant Patent mailed Oct. 9, 2003", 2 pgs.
"European Application Serial No. 974109.1, Office Action mailed Sep. 10, 2002", 2 pgs.
"European Application Serial No. 974109.1, Response filed Mar. 18, 2003 to Office Action mailed Sep. 10, 2002", 5 pgs.
"International Application Serial No. PCT/2001/17349, International Preliminary Examination Report mailed Nov. 15, 2002", 5 pgs.
"International Application Serial No. PCT/US2000/040909, International Preliminary Examination Report mailed Dec. 10, 2001", 10 pgs.
"International Application Serial No. PCT/US2000/040909, International Search Report mailed Feb. 14, 2001", 3 pgs.
"International Application Serial No. PCT/US2000/040909, Response to Written Opinion mailed Nov. 12, 2001", 6 pgs.
"International Application Serial No. PCT/US2000/040909, Written Opinion mailed Aug. 10, 2001", 5 pgs.
"International Application Serial No. PCT/US2001/017349, International Search Report mailed Feb. 14, 2002", 1 pg.
"Japanese Application Serial No. 202-558739, Office Action mailed Feb. 6, 2004", English translation, 3 pgs.
"Japanese Patent Application No. 2002-558739, Notice of the Reason for Refusal based on International Application No. PCT/US01/18284, mailed Feb. 7, 2006", with English translation., PTO's Mailing No. 040835; No Image Available, 5 pgs.

\* cited by examiner

SYSTEMS AND METHODS FOR PROVIDING A MULTI-PERSPECTIVE VIDEO DISPLAY

CROSS-REFERENCE TO RELATED APPLICATIONS

This application is a continuation of U.S. patent application Ser. No. 13/589,589, titled "SYSTEMS AND METHODS FOR PROVIDING A MULTI-PERSPECTIVE VIDEO DISPLAY," filed Aug. 12, 2012, which is a continuation of U.S. patent application Ser. No. 09/765,965, titled "SYSTEM AND METHOD FOR PROVIDING MULTI-PERSPECTIVE INSTANT REPLAY," filed Jan. 19, 2001, which claims the benefit of priority of U.S. Provisional Application No. 60/235,529, titled "SYSTEM AND METHOD FOR PROVIDING MULTI-PERSPECTIVE INSTANT REPLAY," filed Sep. 26, 2000, each of which is hereby incorporated herein by reference in its entirety.

Each of U.S. patent application Ser. No. 09/630,646, titled "SYSTEM AND METHOD FOR INCORPORATING PREVIOUSLY BROADCAST CONTENT," filed Aug. 2, 2000, and U.S. Provisional Patent Application No. 60/162,490, titled "RECORDING OF PUSH CONTENT," filed Oct. 29, 1999, is hereby incorporated herein by reference in its entirety.

FIELD OF THE INVENTION

The present invention relates generally to interactive video delivery mediums such as interactive television, and more particularly, to a system and method for providing multi-perspective instant replay of broadcast material.

BACKGROUND

A broadcast service provider transmits audio-video streams to a viewer's television. Interactive television systems are capable of displaying text and graphic images in addition to typical audio-video programs. They can also provide a number of services, such as commerce via the television, and other interactive applications to viewers. The interactive television signal can include an interactive portion consisting of application code, data, and signaling information, in addition to audio-video portions. The broadcast service provider can combine any or all of this information into a single signal or several signals for transmission to a receiver connected to the viewer's television or the provider can include only a subset of the information, possibly with resource locators. Such resource locators can be used to indicate alternative sources of interactive and/or audio-video information. For example, the resource locator could take the form of a world wide web universal resource locator (URL).

The television signal is generally compressed prior to transmission and transmitted through typical broadcast media such as cable television (CATV) lines or direct satellite transmission systems. Information referenced by resource locators may be obtained over different media, for example, through an always-on return channel, such as a DOCSIS modem.

A set top box connected to the television controls the interactive functionality of the television. The set top box receives the signal transmitted by the broadcast service provider, separates the interactive portion from the audio-video portion, and decompresses the respective portions of the signal. The set top box uses interactive information to execute an application while the audio-video information is transmitted to the television. Set top boxes typically include only a limited amount of memory. While this memory is sufficient to execute interactive applications, it is typically not adequate to store the applications for an indefinite period of time. Further, the memory of the set top box is typically too small to accommodate a program which includes large amounts of audio or video data, application code, or other information. Storage devices may be coupled to the set top box to provide additional memory for the storage of video and audio broadcast content.

Interactive content such as application code or information relating to television programs is typically broadcast in a repeating format. The pieces of information broadcast in this manner form what is referred to as a "carousel". Repeating transmission of objects in a carousel allows the reception of those objects by a receiver without requiring a return path from the receivers to the server. If a receiver needs a particular piece of information, it can simply wait until the next time that piece of information is broadcast, and then extract the information from the broadcast stream. If the information were not cyclically broadcast, the receiver would have to transmit a request for the information to the server, thus requiring a return path. If a user is initially not interested in the carousel content, but later expresses an interest, the information can be obtained the next time the carousel is broadcast. Since broadcast networks have access only to a limited bandwidth, audio-video content is not broadcast in carousels. There is also insufficient bandwidth and server resources to handle pulling of large amounts of data required for video and audio in real-time to handle near simultaneous requests for broadcast of previously broadcast material from a vast number of television viewers.

In a broadcast by a television network, such as a broadcast of a sporting event, the content provider may generate multiple video feeds from various angles of the game, for example. The network may select one or more feeds from the multiple video feeds and broadcast the selected video feed(s) to the viewing audience at any given point in time. That is, the network may simultaneously broadcast video tracks that present the same scene, except from a different perspective or send different audio tracks or subtitles if a movie is broadcast in different languages, for example. The viewer may use an interactive application that executes on their set top box to choose between different perspectives. When a viewer requests a change in perspective, the interactive application uses meta-data to determine which packets contain the chosen perspective. It starts delivering packets that contain the newly chosen perspective.

As previously described, a viewer cannot request previously broadcast audio or video material due to the limited bandwidth available on broadcast networks. Also, data that accompanies interactive applications sometimes corresponds to audio and video that is currently being broadcast, so it changes frequently. In these cases, the values broadcast as part of the carousel often change and old values are no longer carried in the carousel. Thus, a viewer cannot replay a scene or a sporting event play from a different perspective unless the viewer has already recorded the video stream for the alternate perspective.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. It will be understood by one skilled in the art that many embodiments are possible, such as the use of a computer system and display to perform the functions and features described herein. For purpose of clarity, the invention will be described in its application to a set top box used with a television, and details relating to technical material that are known in the technical fields related to the invention have not been included.

Figure 1:
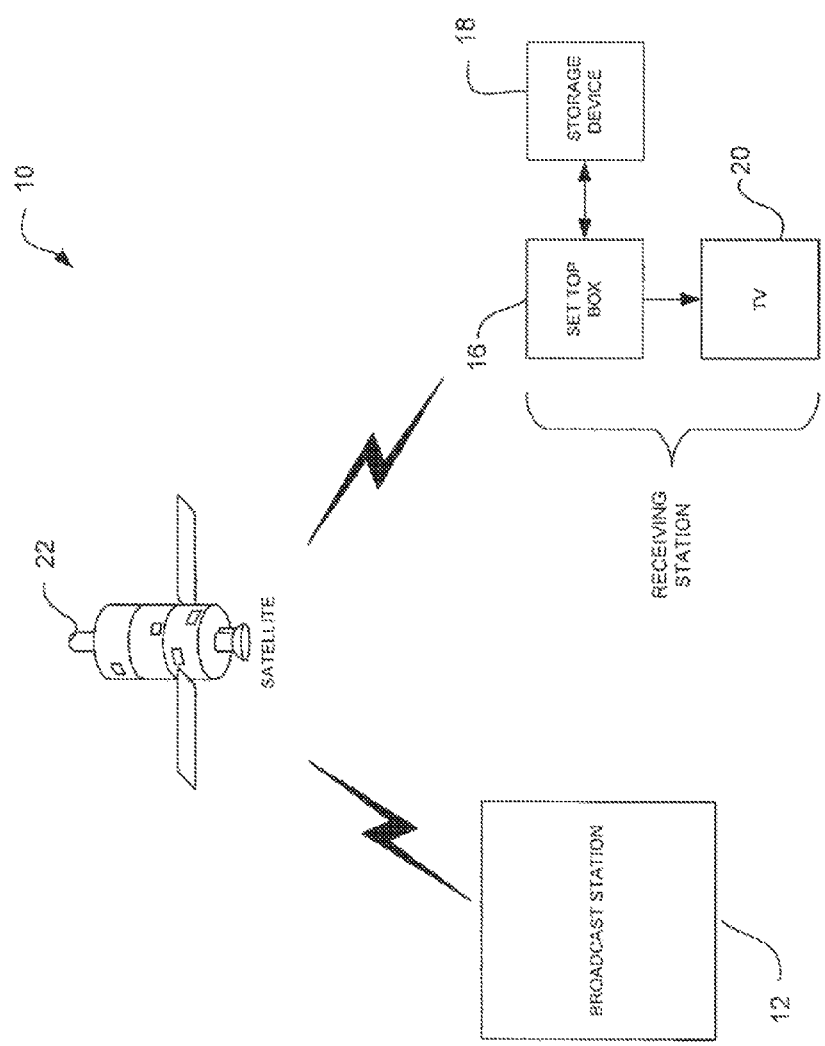
FIG. 1 is a diagram illustrating the distribution of television programs and signaling information from a broadcast station to a receiving station.

Referring now to the drawings, and first to FIG. 1, a diagram of a television broadcast and receiving system is shown and generally indicated at 10. The system 10 includes a broadcast station 20 where audio-video and control information is assembled in the form of digital data and mapped into digital signals for satellite transmission to a receiving station. Control information such as conditional access information and signaling information (such as a list of services available to user, event names, and schedule of events (start time/date and duration), and program specific information) may be added to video, audio, and interactive applications for use by the interactive television system. Control information can describe relationships between streams, such as which streams can be considered as carrying different perspectives of which other streams. The control information is converted by the broadcast station to a format suitable for transmission over broadcast medium. The data may be formatted into packets, for example, which can be transmitted over a digital satellite network. The packets may be multiplexed with other packets for transmission. The signal is typically compressed prior to transmission and may be transmitted through broadcast channels such as cable television lines or direct satellite transmission systems 22 (as shown in FIG. 1). The Internet, telephone lines, cellular networks, fiber optics, or other terrestrial transmission media may also be used in place of the cable or satellite system for transmitting broadcasts. The broadcaster may embed service information in the broadcast transport stream, and the service information may list each of the elementary stream identifiers and associate with each identifier an encoding that describes the type of the associated stream (e.g., whether it contains video or audio) and a textual description of the stream that can be understood and used by the user to choose between different perspectives, as described below.

The receiving station includes a set top box 16 connected to a storage device 18, and a television 20 which is used to present programs to a viewer. The set top box 16 is operable to decompress the digital data and display programs to a viewer. The decompressed video signals may be converted into analog signals such as NTSC (National Television Standards Committee) format signals for television display. Signals sent to the set top box 16 are filtered and of those that meet the filtering requirements, some are used by the processor 30 immediately and others can be placed in local storage such as RAM. Examples of requirements that would need to be filtered for include a particular value in the location reserved for an elementary stream identifier or an originating network identifier. The set top box 16 may be used to overlay or combine different signals to form the desired display on the viewer's television 20.

As further described below, the set top box 16 is configured to record one or more video and/or audio streams simultaneously to allow a viewer to replay a scene which has recently been viewed or heard by a viewer, except from a different perspective. Broadcast station 12 simultaneously broadcasts multiple perspectives for use by viewers that have set top boxes 16 which execute interactive television applications. For example, multiple cameras may be used to record a sporting event and the station may broadcast from the multiple cameras at the same time to allow the viewer to choose between different camera views using an interactive application that executes on their set top box 16. A broadcaster may also send multiple perspectives of audio tracks in different languages, for example. The multiple video and audio perspectives are only examples of types of perspectives of which a plurality may be contained in a broadcast. Other examples include multiple teletext streams, perhaps in different languages; multiple executables, perhaps each meant for a different skill level; or multiple data streams. The present invention allows a viewer to replay the same scene from a different perspective, while ensuring that the viewer will still be able to view, either simultaneously or at a later time, the portion of the program being broadcast simultaneously with their viewing of the replay. The viewer may request a replay of any combination of audio, video, executables, and data, from either the same or different perspectives as the perspectives previously played.

It is to be understood that the term "program" as used herein refers to any broadcast material including television shows, sporting events, news programs, movies, or any other type of broadcast material, or a segment of the material. The material may include only audio, video, data, or any combination thereof. The program may be only a portion of a television show or broadcast (e.g., without commercials or missing a portion of the beginning or end) or may be more than one show, or include commercials for example. Furthermore, it is to be understood that the term "viewing" as used herein is defined such that viewing of a program begins as soon as a tuner begins filtering data corresponding to a program. If a viewer has tuned to a particular frequency prior to the broadcast of a program, the beginning of the viewing preferably corresponds to the beginning of the program. The viewing preferably ends when the program is complete or when the tuner is no longer filtering the frequency corresponding to the program. Thus, the recording of a program coincides with the "viewing" of a program and the program is only recorded when a tuner is tuned to the station broadcasting the program. In the event that the television display is turned off after a viewer has started recording the program, as long as the tuner is tuned into the station broadcasting the program and a recording of the information broadcast on the same frequencies as those used at the start of the viewing is being made, the viewing is said to continue. The audio-video signals and program control signals received by the set top box 16 correspond to television programs and menu selections that the viewer may access through a user interface. The viewer may control the set top box 16 through an infrared remote control unit, a control panel on the set top box, or a menu displayed on the television screen, for example.

It is to be understood that the system 10 described above and shown in FIG. 1 is only one example of a system used to convey signals to the television 20. The broadcast network system may be different than described herein without departing from the scope of the invention.

The set top box 16 may be used with a receiver or integrated decoder receiver that is capable of decoding video, audio, and data, such as a digital set top box for use with a satellite receiver or satellite integrated decoder receiver that is capable of decoding MPEG video, audio, and data. The set top box 16 may be configured, for example, to receive digital video channels which support broadband communications using Quadrate Amplitude Modulation (QAM) and control channels for two-way signaling and messaging. The digital QAM channels carry compressed and encoded multiprogram MPEG (Motion Picture Expert Group) transport streams. A transport system extracts the desired program from the transport stream and separates the audio, video, and data components, which are routed to devices that process the streams, such as one or more audio decoders, one or more video decoders, and optionally to RAM (or other form of memory) or a hard drive. It is to be understood that the set top box 16 and storage device 18 may be analog, digital, or both analog and digital.

Figure 2:
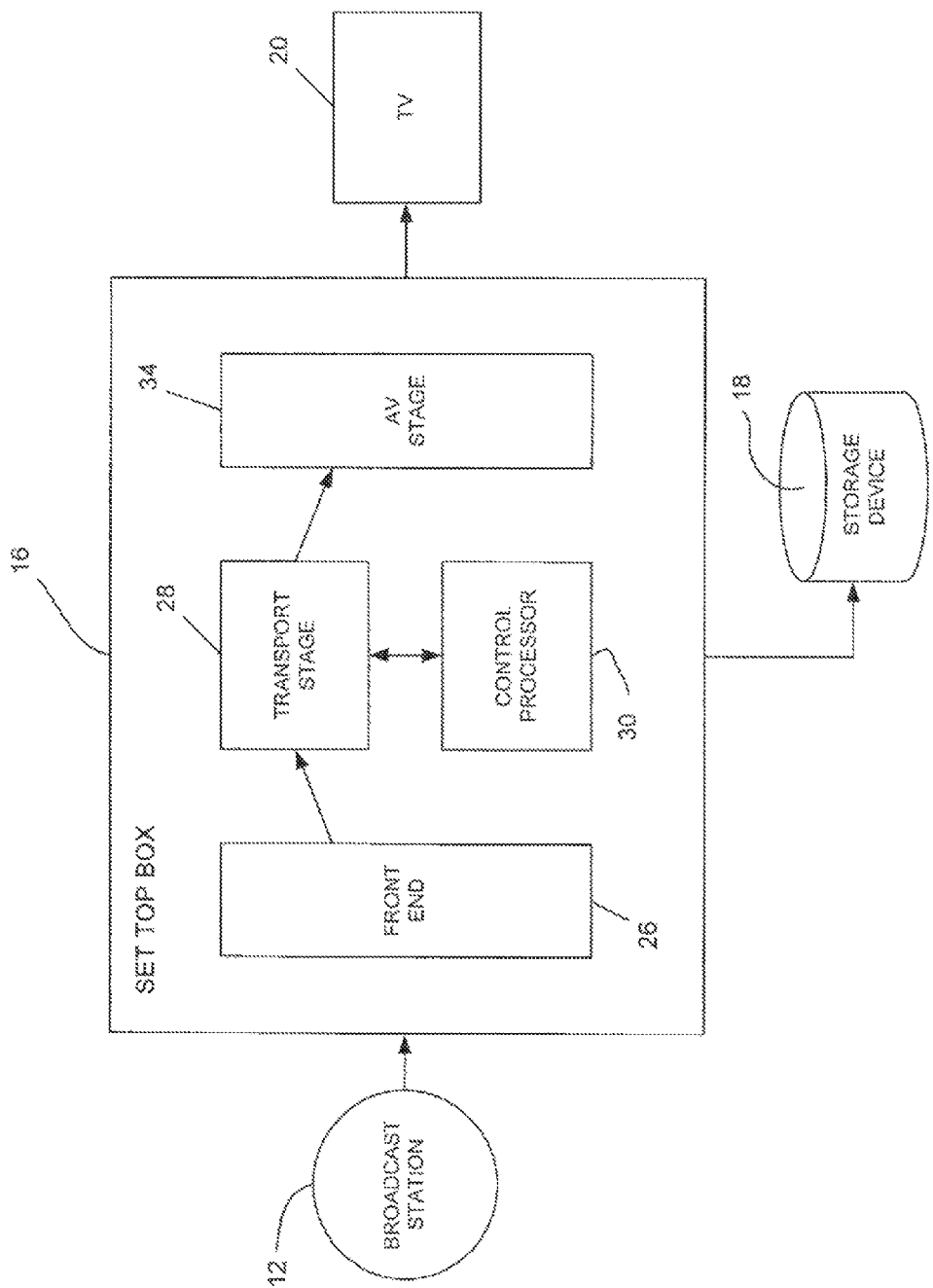
FIG. 2 is a block diagram of a system of the present invention for recording programs received from the broadcast station of FIG. 1.

As shown in FIGS. 1 and 2, the storage device 18 is coupled to the set top box 16. The storage device 18 is used to provide sufficient storage to record programs that will not fit in the limited amount of main memory (e.g., RAM) typically available in set top boxes. The storage device 18 may comprise any suitable storage device, such as a hard disk drive, a recordable DVD drive, magnetic tape, optical disk, magneto-optical disk, flash memory, or solid state memory, for example. The storage device 18 may be internal to the set top box 16 or connected externally (e.g., through an IEEE 1394-1995 connection) with either a permanent connection of a removable connection. More than one storage device 18 may be attached to the set top box 16. The set top box 16 and/or storage device 18 may also be included in one package with the television set 20.

FIG. 2 illustrates one embodiment of a system of the present invention used to record programs received from the broadcast station 12. The set top box 16 generally includes a control unit (e.g., microprocessor), main memory (e.g., RAM), and other components which are necessary to select and decode the received interactive television signal. As shown in FIG. 2, the set top box 16 includes a front end 26 operable to receive audio, video, and other data from the broadcast station 12. The broadcast source is fed into the set top box 16 at the front end 26, which comprises an analog to digital (A/D) converter and tuner/demodulators (not shown). The front end 26 filters out a particular band of frequencies, demodulates it and converts it to a digital format. The digitized output is then sent to a transport stage 28. The transport stage 28 further processes the data, sending a portion of the data to an audio-visual (AV) stage 34 for display and another portion to the control processor 30, and filtering out the rest of the data.

Control information may also be recorded as broadcast along with the audio-video data or may be first manipulated by software within the set top box 16. For example, broadcast CA (conditional access) information may be used to decrypt broadcast video. The original broadcast streams, or modifications of these streams may be optionally re-encrypted using a set top box key or algorithm prior to recording. The encrypted video may also be stored as received along with the broadcast CA information. Also, clock information may be translated to a virtual time system prior to recording. An MPEG-2 elementary stream may be de-multiplexed from an MPEG-2 transport stream, then encapsulated as a program stream and recorded.

Figure 3:
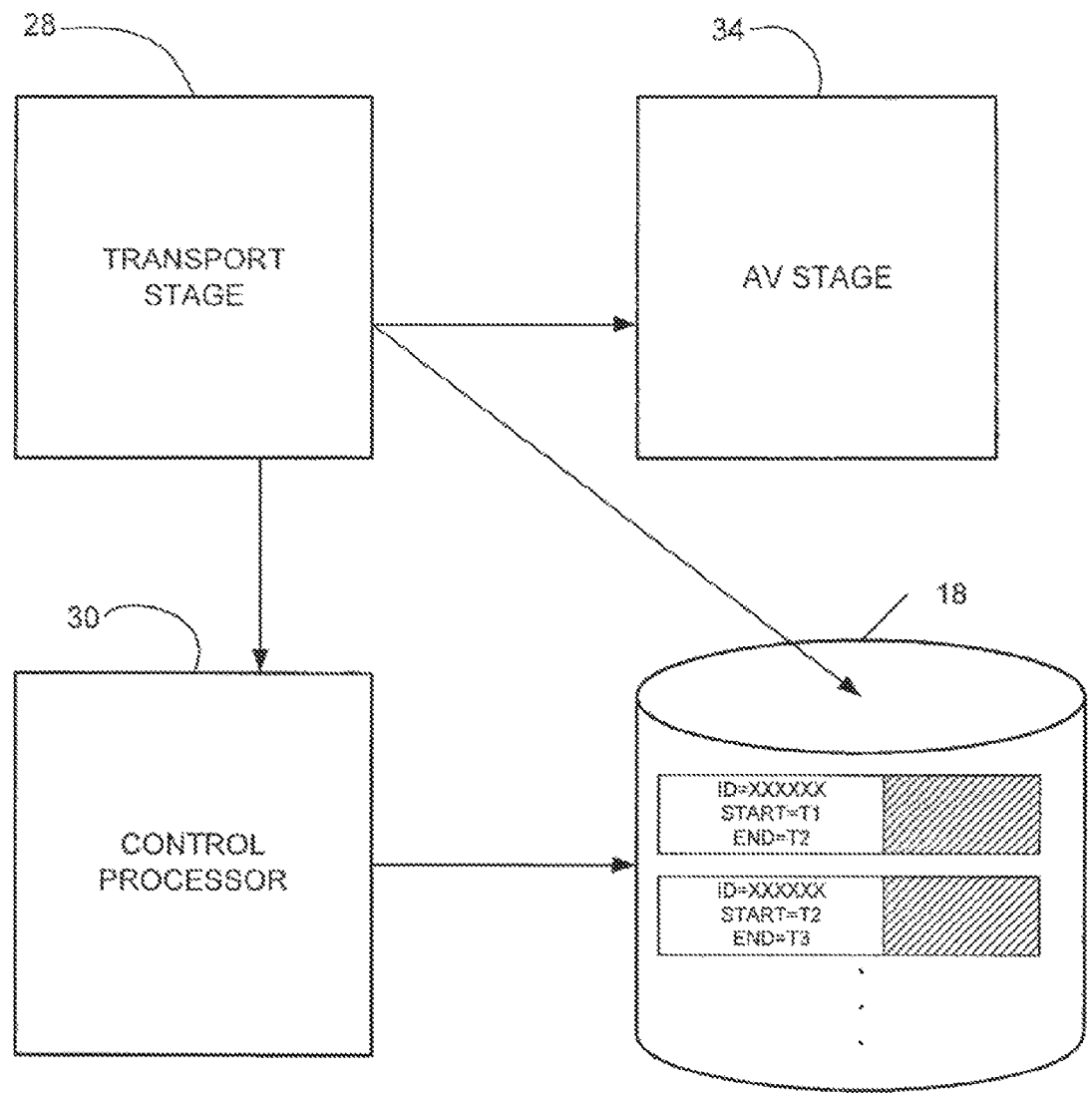
FIG. 3 is a block diagram illustrating the transfer of data to a storage device coupled to the set top box of FIG. 2.

FIG. 3 illustrates the transfer of data from the transport stage 28 to the storage device 18. The storage device 18 typically contains a plurality of programs which have been recorded by a viewer. The recordings of each perspective are associated with identifying information that may have been copied or modified from the original signaling information. This identifying information may contain bookkeeping information similar to that typically stored in audio/video file systems or hierarchical computer file systems. The identifying information may have various formats and content, as long as it provides sufficient information to allow the viewer, possibly interacting with the system, to uniquely retrieve a particular recorded perspective. The programs may be identified with an ID number and a start time and end time. As described below, the storage may be defragmented periodically so that the programs are stored in a contiguous manner. Direct memory access (DMA) is preferably used to send data from the transport stage 28 to the storage device 18. The data that is sent to the control processor 30 may include meta-data which describes the content of the audio-video data streams and may also include application programs and corresponding data that can be executed on the control processor in order to provide interactive television.

A copy of data sent from the transport stage 28 to the AV stage 34 is sent to the storage device 18 at the beginning of the viewing. The CPU in the control processor 30 configures a DMA controller to ensure that the data is written to a buffer that is allocated in the storage device 18. The number of minutes of viewing data to be recorded in the buffer is preferably selected by the viewer; however, the set top box may 16 be preset with a default value such as fifteen minutes. The control processor's CPU calculates the size of the buffer to allocate based upon the number of minutes and the maximum speed at which bits in the transport stream that the viewer is watching will be sent. This maximum speed may be obtained from meta-data sent with the audio-video stream. When the end of the buffer is reached, the CPU in the control processor is interrupted, at which time it will re-configure the DMA controller to start writing at the beginning of the buffer. This design is known as a circular buffer.

The buffer is preferably circular to allow contiguous recording and writing over of previously recorded content. When the viewer changes the channel or a TV event (e.g., television program ends) occurs, the control processor's CPU will be interrupted. At this time, the CPU may allocate a new buffer or mark the beginning of the new event in the original buffer. The automatic recording of a program and all related video, audio, and data streams in a storage device at the start of the program without any action by the viewer, allows the viewer to replay a portion of the program from a different perspective.

As previously described, the control processor 30 records the multi-perspective streams at a start of the program to store the perspectives in storage device 18. The perspectives will continue to be recorded and stored within the storage device 18 for a pre-determined period of time (e.g., 15 minutes). If a viewer decides to record the entire viewing after the start of the program, he will select a record option and the processor 30 will allocate space within the storage device 18. All perspectives will be recorded along with the program that is being viewed. See e.g., U.S. patent application Ser. No. 09/630,646, entitled "System and Method for Incorporating Previously Broadcast Content" and filed Aug. 2, 2000, which is incorporated herein by reference in its entirety.

The joining of the first and second recorded portions of any given perspective in a common storage area may be implemented either physically or virtually. A physical implementation may include copying the first recorded portion to a location where the second portion has been recorded. A virtual implementation may include the modification of a data structure stored in a storage device. In either case, a viewer watching a replay of any perspective should not be able to detect that the two parts of the perspective were originally stored separately. Thus, the portions of the perspective may be physically contiguous or the portions of the perspective may be stored separately in a non-contiguous format as long as the entire recorded program can be played back in a continuous manner (i.e., viewer does not notice a transition between the playback of the first and second portions of the perspective).

It is to be understood that the recording of the entire program, including the plurality of perspectives, in the storage device 18 may occur without any action by the viewer. For example, if the viewer rewinds (or performs a similar action on different types of storage media) a portion of one of the recorded perspectives to replay a scene, the entire program along with all of its multiple perspectives may be recorded in the storage device, since the viewer has shown interest in the program.

The control information that is broadcast with the program preferably indicates which streams are related to the viewed streams. The set top box 16, by filtering on the appropriate identifiers in the broadcast MPEG-2 (or DSS or other encoding) packets can locate all related elementary streams. It sends the streams that the viewer is watching to the television set 20 and records in the storage device 18 the content of these streams, along with the other related streams, including related video, audio, executables, and data. Meta-data that indicates the maximum bit rate for the streams may accompany the elementary or transport streams. The format of the recorded streams may depend upon the hardware support. For example, special purpose hardware inside the set top box 16 may support re-multiplexing of streams or concurrent reads and writes to the storage device 18, as is well known by those skilled in the art.

Broadcast data such as audio and video data, application code, control signals and other types of information may be sent as data objects. If the program is to be consumed (i.e., presented to the viewer) the broadcast data must be parsed to extract data objects from the stream. When the necessary data objects have been extracted, the program is played. For example, any applications that need to be executed are launched and any audio or video data that needs to be presented to the viewer is played. If the program is stored, the data objects are extracted in the same manner, but they are stored instead of being immediately used to present the program. The recorded program is played back using the stored data objects. The data objects may include "live" data which becomes obsolete if not consumed immediately. If this data is stored and used when the program is played back, the program will in at least part, be obsolete. Thus, while most of the data objects may be stored as files, live data objects may be stored as references in the program. When the program is played back, new live data corresponding to the reference may be obtained and used in place of the data which was live at the time the program was recorded. Thus, only temporally correct data is used by the interactive application when it executes at a later time. (See e.g., U.S. Provisional Patent Application No. 60/162,490 entitled "RECORDING OF PUSH CONTENT" filed Oct. 29, 1999, which is incorporated herein by reference for all purposes).

FIGS. 4-10 show the set top box 16 receiving three video and two audio streams from the broadcast station 12. The signals are received from the broadcast station 12 at the tuner in front end 26 and related streams are sent to demultiplexer and processor 100. Video streams V1, V2 and audio stream A1 are all related (e.g., video streams are different camera views of a sporting event and A1 is the sound track for the announcer) and can be provided in a single transport stream. If all the related streams are provided in one transport stream only one tuner 50 is required. The set top box 16 may include multiple tuners 50 for recording and displaying related streams broadcast in separate transport streams. Related streams are preferably broadcast on a small number of frequencies so that a large number of tuners will not be required within or attached to the set top box 16. For example, a large number (e.g., five) of video streams along with multiple audio streams, executable programs, data, and control information may be multiplexed together on a single frequency.

FIGS. 4-7 illustrate a case where a viewer requests a replay from a different perspective using a picture-within-picture (PIP) mode. If a viewer wants to see the replay from a different perspective, it can be viewed in a PIP mode without requiring multiple tuners in the set top box 16 or the television 20. The additional tuner is not required since one of the video or audio streams that had been previously recorded is coming from the storage device 18. All streams shown are preferably multiplexed on the same frequency. The video or audio can be delivered directly to the AV stage 34 which is contained in 100 which itself is inside the set top box 16, and may be multiplexed with a transport stream that is being delivered via the tuner 50. Note that 100 represents three components: (i) a demultiplexer; (ii) a processor that directs portions of the broadcast information to other components; and (iii) an AV stage that modulates when necessary (i.e. when the television is analog). Alternatively, the viewer can choose to view only the replay while the set top box 16 buffers, on the storage device 18, the live broadcast for later delivery, as described below with respect to FIGS. 8-10.

Figure 4:
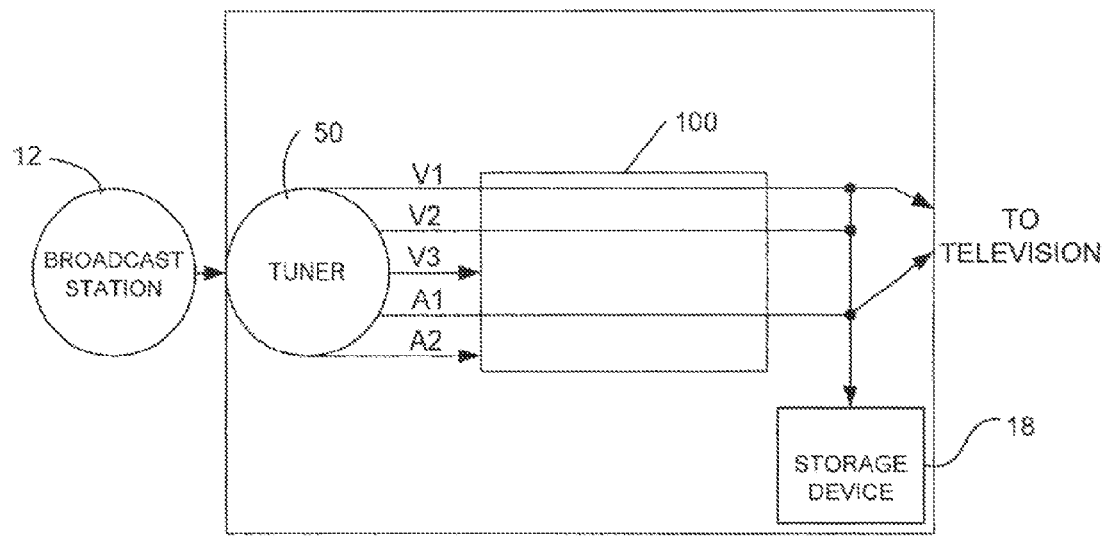
FIG. 4 is a diagram illustrating three video streams and two audio streams simultaneously sent to a receiving station with one of the audio and one of the video streams sent to a television. Those same streams are also sent to a storage device along with one of the other video streams.
Figure 5:
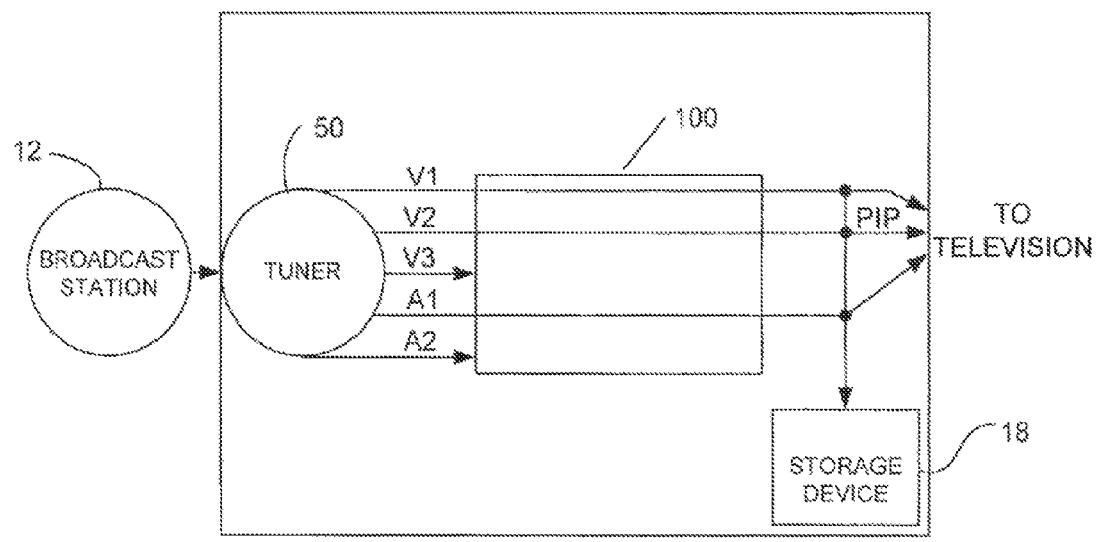
FIG. 5 is similar to the diagram of FIG. 4 except that the second video stream is now also displayed in a PIP window along with the first audio and video streams which are displayed in the main picture of the television.
Figure 6:
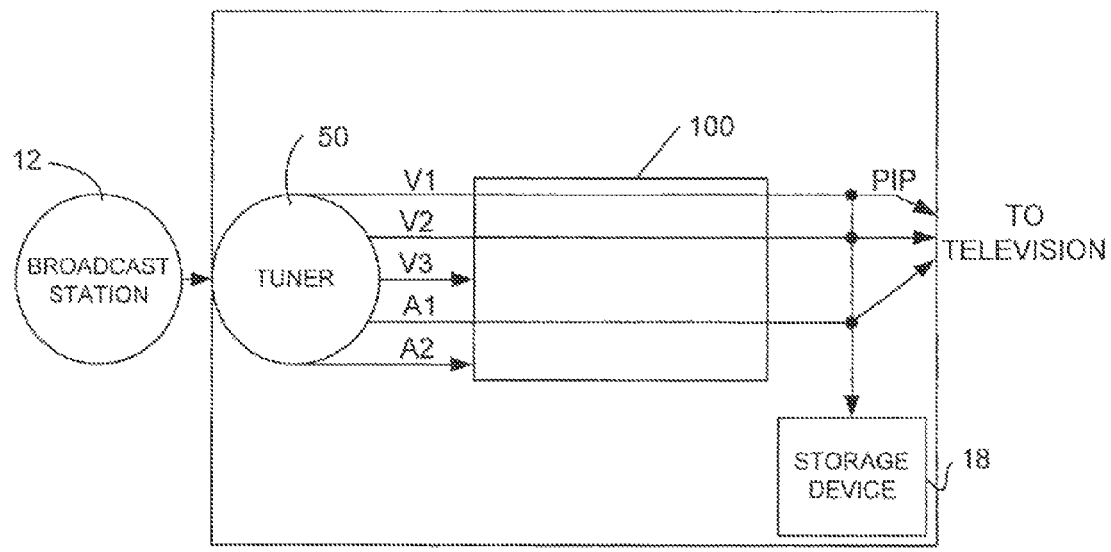
FIG. 6 is a diagram similar to the diagram of FIG. 5 except that the second video stream is now shown in the center of the television screen with the first video stream shown in the PIP window.

In FIG. 4, the broadcast station 12 is sending video streams V1 and V2 containing two different perspectives and one audio stream A1. The two video streams may be two different camera positions at a baseball game, for example. The viewer is currently watching video stream V1 and listening to audio stream A1. The first and second video streams V1 and V2 and the audio stream A1 are automatically recorded. Thus, the previously broadcast information is available if a viewer wants to replay, for example, the last play of the game. In particular, with this invention, the viewer can replay this information from any of the previously broadcast perspectives. The viewer may place the set top box into a PIP mode so that the viewer can see a first perspective (video stream V1) displayed in a large central area in the television screen and a second perspective (video stream V2) displayed in a small picture window in the top right hand corner (or some other area) of the television screen (FIG. 5). After an important play in the game (e.g., double play in a baseball game), the viewer may want to see a replay, this time from a perspective different from the one shown in V1. At this time, the viewer may optionally switch the windows into which the video streams V1 and V2 are displayed, as shown in FIG. 6. Video stream V1 is now sent to the PIP window and video stream V2 is sent to the central viewing window. Then the viewer would give a command (i.e. press a button on the remote control) to re-wind the video in the main window while permitting the PIP window to continue displaying the "live" V1 in the PIP window.

Figure 7:
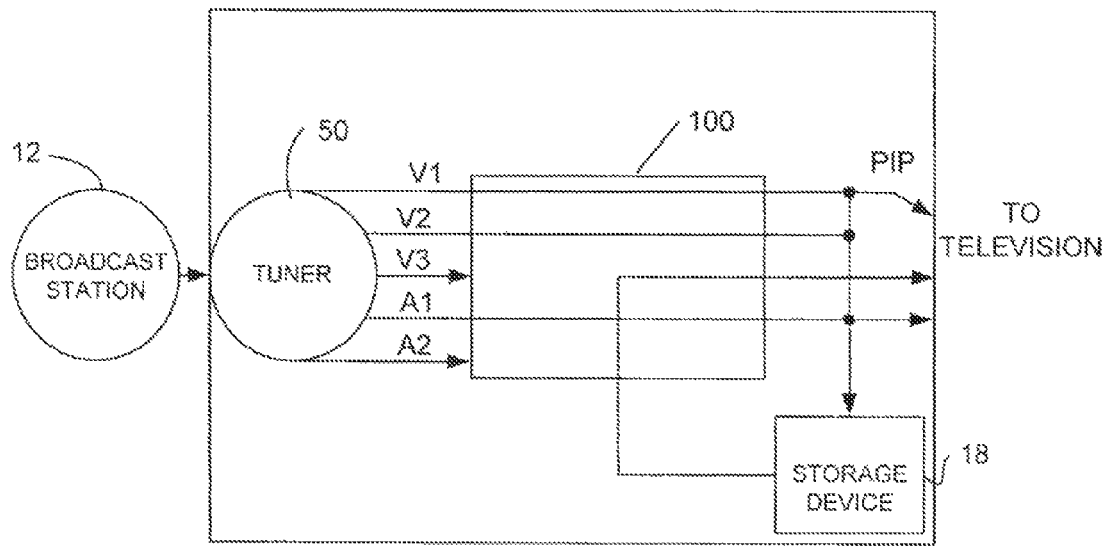
FIG. 7 is a diagram similar to the diagram of FIG. 6 except that the live broadcast of the second video stream is replaced with a previously broadcast version of the same perspective.

As shown in FIG. 7, the recorded video stream V2', which is from the same perspective as V2, but which was broadcast and recorded earlier, is sent from the storage device 18 to the demultiplexer in 100 which sends the previously recorded stream V2' along with the current video stream V1 to the television for display. The viewer may rewind or search through the recording until the beginning of the recording is reached. The viewer may also rewind and display the first video stream V1. Meanwhile the broadcast of the remainder of the program may be sent to the storage device 18 since the viewer has shown an interest in the recording. This may be automatic (i.e., program streams are sent to storage device 18 upon a viewer's request for a replay) or may only occur upon receiving a request from the viewer to record the entire program.

Figure 6A:
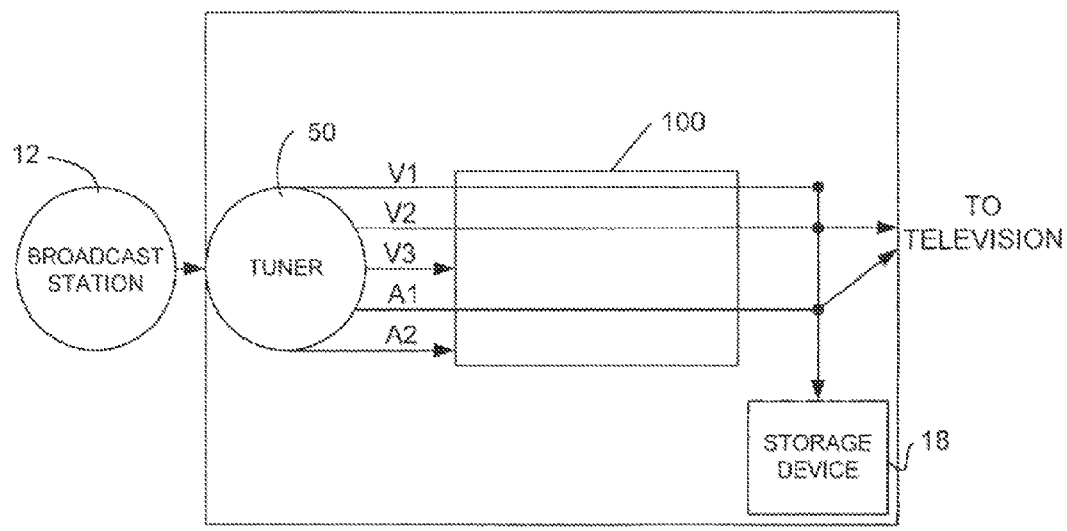
FIG. 6a is a diagram similar to the diagram of FIG. 6 except that the configuration shown does not require or use a PIP.
Figure 7A:
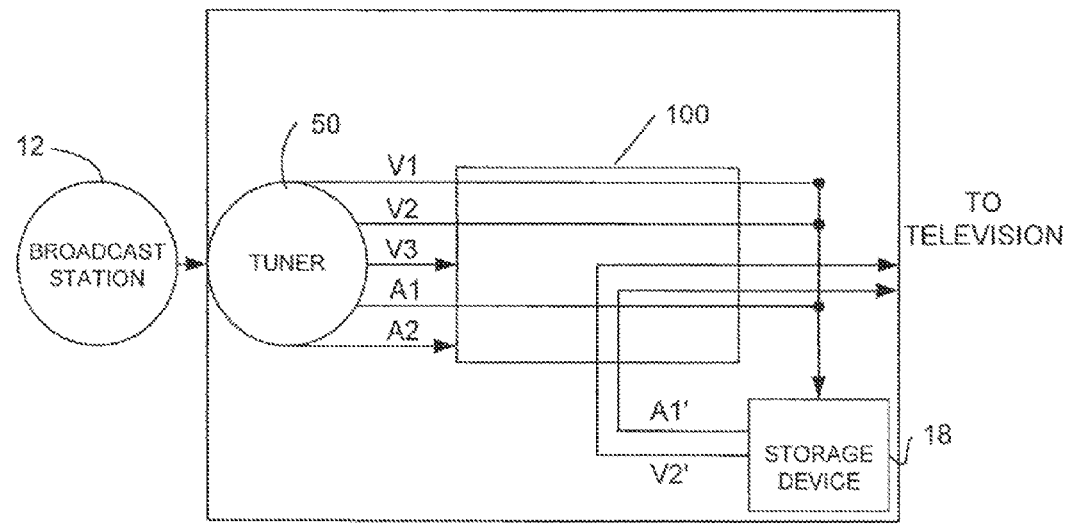
FIG. 7a is a diagram similar to the diagram of FIG. 7 except that the configuration shown does not require or use a PIP, and a recorded audio stream is played instead of a live audio stream as in FIG. 7.

Alternatively, a viewer may prefer not to be distracted by the live broadcast which is shown as being displayed in the PIP in FIG. 7. Therefore, the viewer may simply first switch perspectives from V1 to V2 as shown in FIG. 6a. After that, the viewer may "rewind" to an earlier event to see a previous scene from the perspective carried in video stream V2. This case is shown in FIG. 7a where a copy of the live video stream V1 is only sent to the storage device, along with the live video stream V2 and live audio stream A1. The recorded streams V2' and A1' are the only ones sent, possibly after modulation, to the television. The scenario presented in FIGS. 6a and 7a could also be a scenario used by the viewer to switch between a live video perspective and a different, recorded, video perspective, when there is no PIP functionality associated with the viewer's television.

Figure 8:
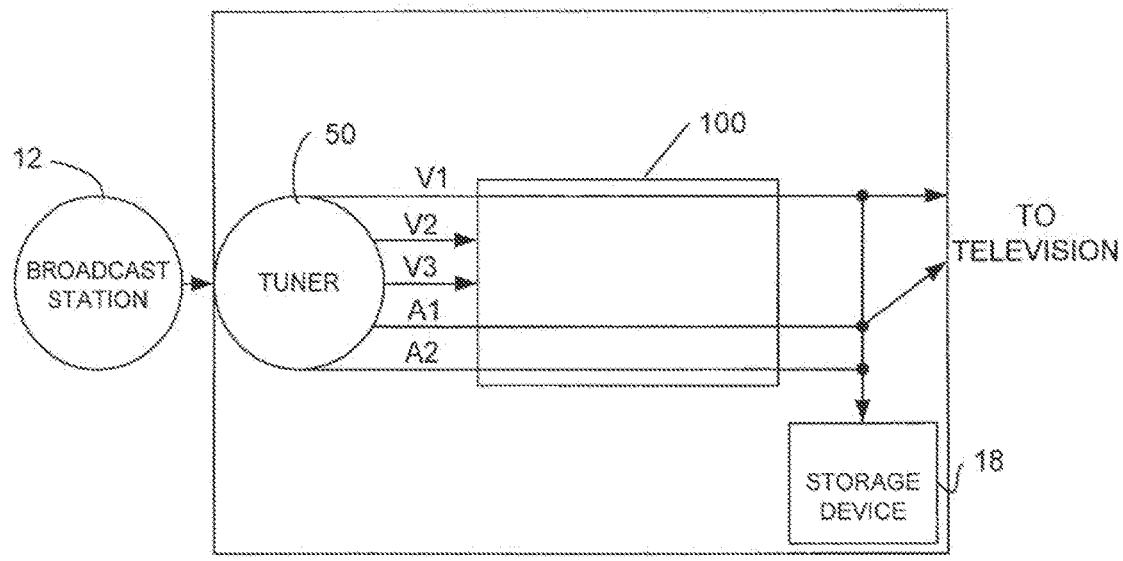
FIG. 8 is a diagram illustrating a first video stream and audio stream displayed on a television and recorded along with a second audio stream.
Figure 9:
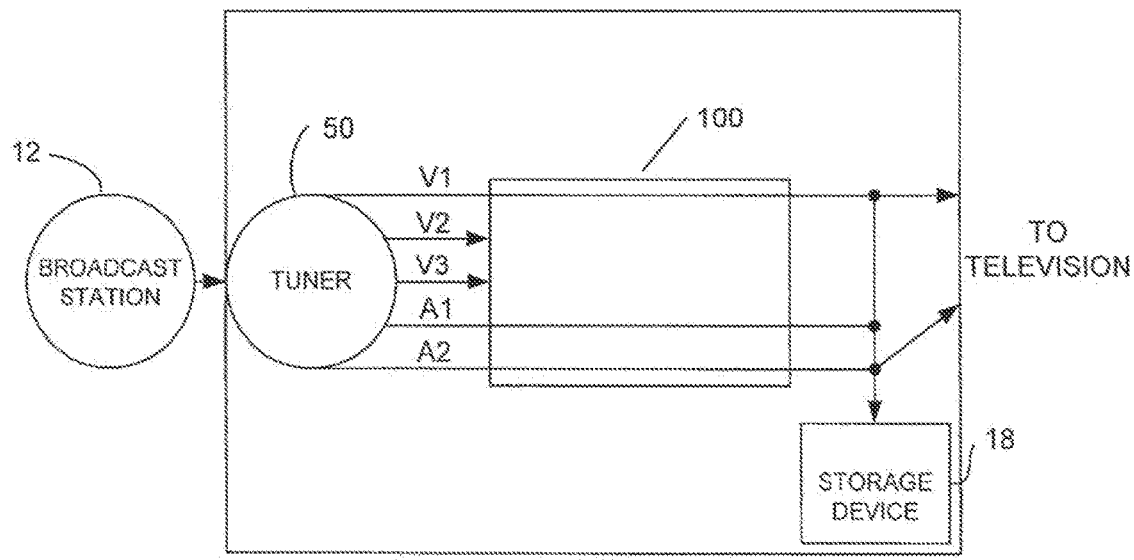
FIG. 9 is a diagram similar to the diagram shown in FIG. 8 except that the first audio stream is replaced with the second audio stream.
Figure 10:
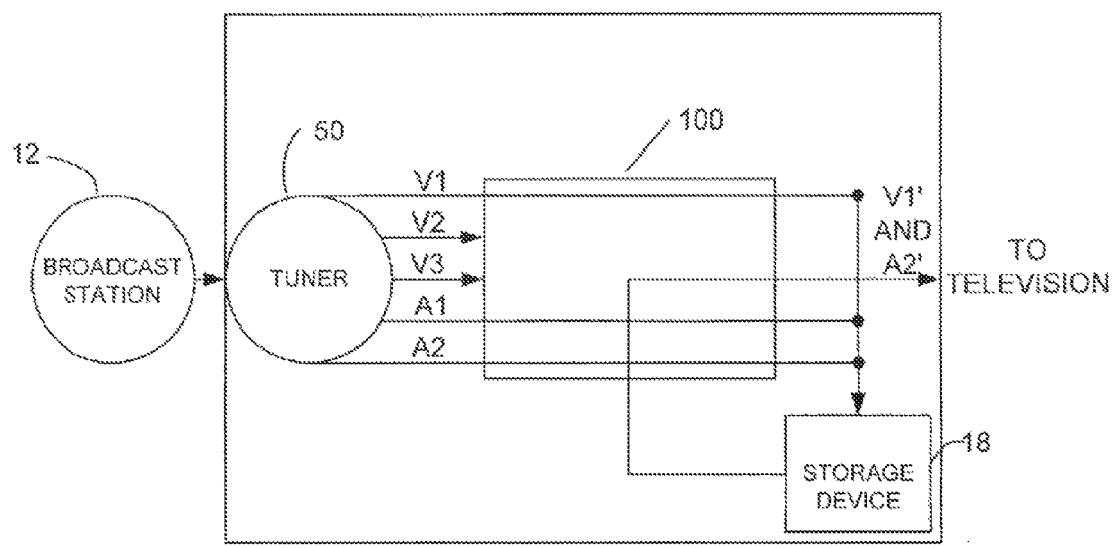
FIG. 10 is a diagram similar to the diagram of FIG. 9 except that the first video stream and second audio stream are replaced with earlier broadcast versions.

FIGS. 8-10 illustrate a case where a program is broadcast with different perspective audio streams. For example, a viewer may be watching an Italian movie that is broadcast with an Italian audio stream A1 and an English audio stream A2. As shown in FIG. 8, video stream V1 and audio stream A1 are presented to the viewer and recorded in the storage device 18 while audio stream A2 is also recorded in the storage device 18 but not presented to the viewer. The viewer is initially listening to the Italian broadcast (audio stream A1); however, during part of the movie, the viewer does not understand the Italian, so he selects a "switch to English" option from a menu and the viewer now hears the English broadcast (audio stream A2) (FIG. 9). If the viewer wants to hear the soundtrack that accompanied the previous scene in English, he may rewind the tape of the video stream V1 and audio stream A2 and watch the scene over again in English (FIG. 10). The video and audio streams V1, A1, and A2 will continue to be recorded so that the viewer can see the rest of the movie in a deferred mode, without missing the portion of the movie that was broadcast while the viewer was rewinding and replaying the previous scene.

Figure 11:
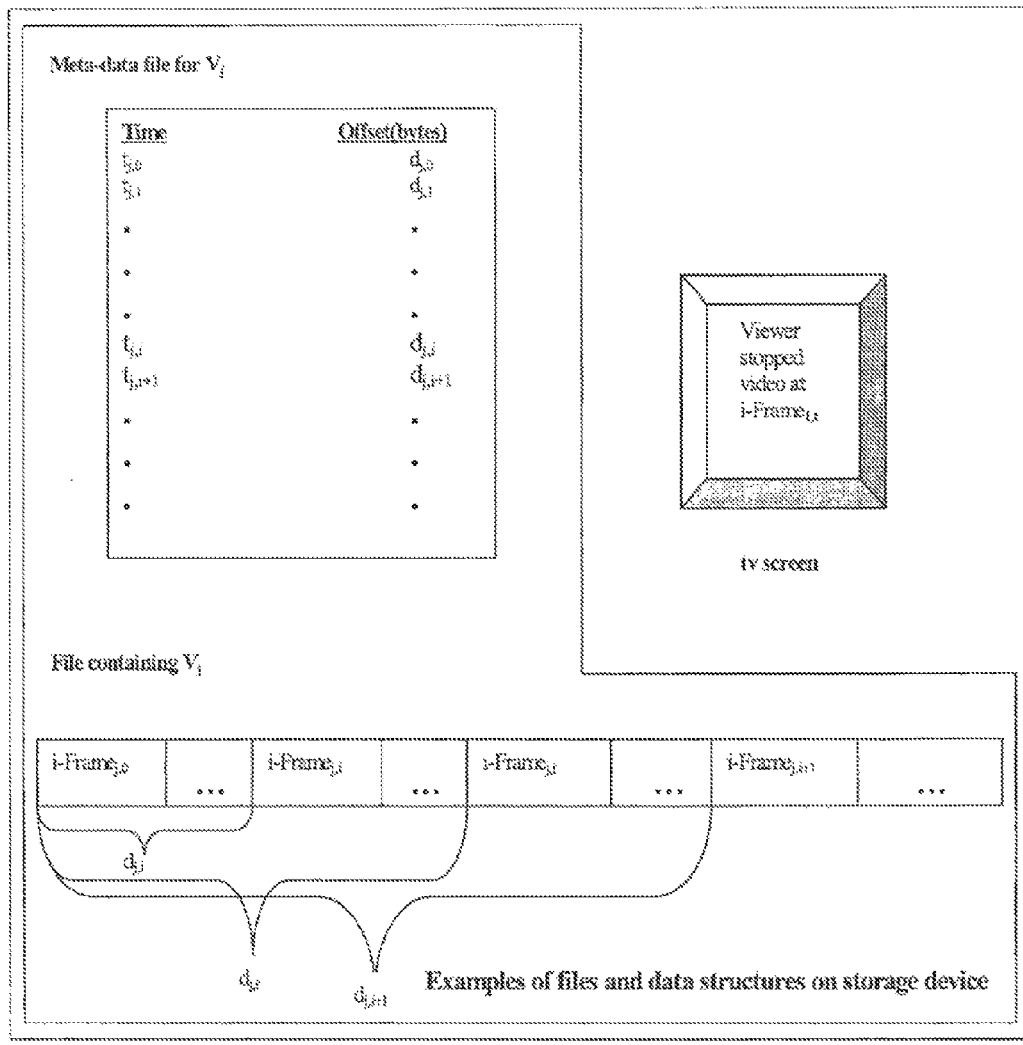
FIG. 11 illustrates an example of files and data structures on a storage device. The text accompanying FIG. 11 describes how these data structures could be used to facilitate the viewing of an instant replay from a different perspective.

FIG. 11 shows an example of a meta-data file that can be stored along with each recorded perspective. This invention does not require the format shown in this figure, but the format is only used as an example of how meta-data can facilitate the playing of an instant replay from a different perspective. Each record of the meta-data file shown contains, among other possible fields, a time and an offset. In this example, a program clock reference is frequently, though not periodically, broadcast along with the video. When some of these clock reference values are received by the set top box, their value, along with the offset into the recording of the most recent I-frame (one of 3 types of MPEG-2 frame encodings that can be used for video), can be recorded as meta-data. Again, this is only an example; an actual implementation may make use of P- and B-frames (the other types of MPEG-2 encodings, both of which are typically more compressed than an I-frame). The offset is in terms of bytes measured from the beginning of the file containing the recording of the perspective.

In this example, the viewer has been watching a live broadcast that contains video perspective $V_1$. As the viewer watches, that video perspective, $V_1$ is being recorded to a file. Also, other video perspectives, including video perspective $V_2$, are being recorded to a different file because they represent a different view of the same information. Of course. $V_2$ could be recorded in the same file as long as other information distinguishing $V_1$ from $V_2$ is recorded somewhere. The viewer has just seen something interesting on the screen and enters the appropriate commands to cause $V_1$ to be re-wound to the beginning of the interesting scene. The viewer stops $V_1$ when the MPEG-2 I-Frame$_{1,t}$ is being used to display the contents of the screen. (Again, this is only an example. P- and B-frames could also be recorded in the file containing the I-frames from $V_1$, and could be used in locating a scene, but they are not used in this example. Also, MPEG-2 is only used as an example; other formats of media and/or data can equally well be used) The viewer then issues a command that tells the set top box to start playing forward, but from $V_2$ rather than from $V_1$. The set-top box must determine which I-frame of $V_2$ it should first cause to be displayed. A simple solution, choosing the I-frame nearest to the same offset as I-frame$_{1,t}$ in the file that contains $V_2$ would only work correctly if both perspectives were sent at the same constant rate, although such an approximation may be useful if the perspectives were sent at approximately the same non-constant rate. A better solution for either variable-rate streams or streams with different constant rates is now presented. This solution uses a linear interpolation, although other well-known classical interpolation methods that are readily available in the open literature may provide a better approximation under some circumstances.

First the actual time corresponding to the originally intended playing time of I-frame$_{1,t}$ is approximated. The offset into the file containing $V_1$ where I-frame$_{1,t}$ is located, $d_{1,t}$ is used for this approximation. In order to approximate this time, t, two consecutive time values, $d_{1,i}$ and $d_{1,i+1}$, are searched for in the meta-data file, such that $d_{1,i} \leq d_{1,t} < d_{1,i+1}$. (As a practitioner of the art would know, a binary search would likely find these two consecutive elements the most quickly if the records are fixed length and the elements are stored in consecutive order as shown. A different search would be optimal if a different storage format is used. Again, these are well-known techniques that are extensively documented in the computer science literature.) Once they are located, both $t_{1,i}$ and $t_{1,i+1}$ will also be known. These values are then used to approximate t. This example uses the linear interpolation formula:

$$t = ((t_{1,i+1} - t_{1,i})(d_{1,t} - d_{1,i})/(d_{1,i+1} - d_{1,i})) + t_{1,i}$$

After an approximation for t has been found, the location of the I-frame in the recording of perspective $V_2$ that is nearest to that time needs to be found. The first step here is to locate $t_{2,k}$ and $t_{2,k+1}$ such that $t_{2,k} \leq i < t_{2,k+1}$. Again, the search that performs the best in any given case is dependent upon the format of the file and is a well-studied problem. Having these values allows for an approximation of $d_2$,t. Once again, this example uses linear interpolation:

$$d_{2,t} = ((d_{2,j+1} - d_{2,j})(t - t_{2,j})/(t_{2,j+1} - t_{2,j})) + d_{2,j}$$

Now that an approximation for $d_{2,t}$ is known, the I-frame that is nearest to being $d_{2,t}$ bytes from the beginning of the file containing the recording of $V_2$ is used as the starting frame for playing back the recording for the viewer.

Figure 12:
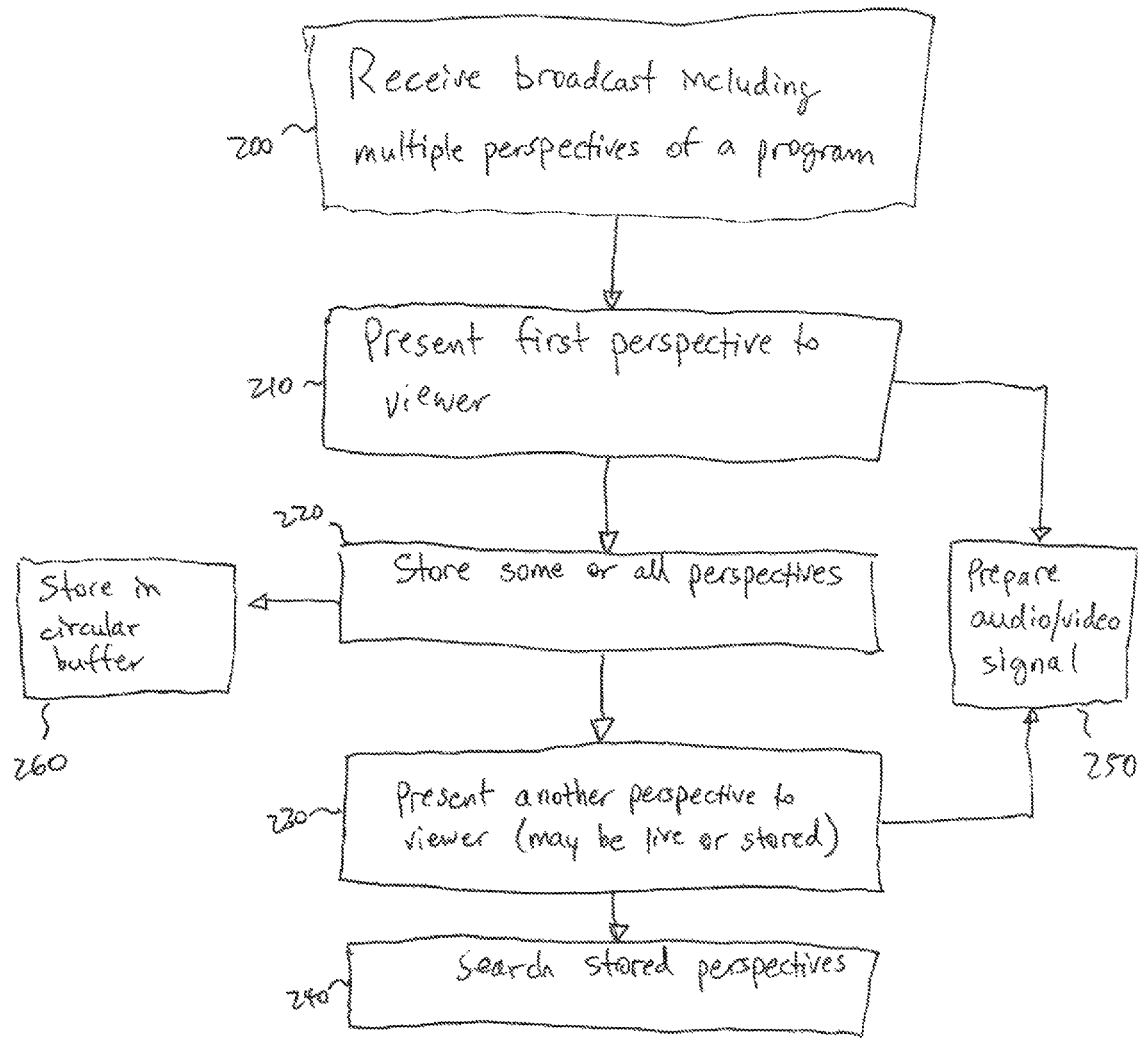
FIG. 12 is a flowchart of a method in accordance with the invention.

FIG. 12 shows a process flow in accordance with the embodiment described herein. For the sake of clarity, the process has been illustrated with a specific flow, but it should be understood that other sequences are possible and that some may be performed in parallel, without departing from the spirit of the invention. In step 200, the system receives a broadcast including multiple perspectives of a program. The system presents one of the perspectives to the viewer, step 210, and stores all of the perspectives in a storage device, step 220. In the embodiment disclosed, the system stores all of the perspectives, but may be configured to selectively store perspectives based on criteria provided by the viewer (such as an indication of which perspectives the viewer is interested in). The perspectives are stored in a circular buffer, step 260. Another perspective is presented to the viewer, step 230, and the presentation of this perspective and the first perspective includes preparation of an audio/video signal for the television, step 250. The presentation of the other perspective in step 230 may involve searching the stored perspectives, step 240, and the perspective presented may be one of the stored perspectives.

A method and system for processing broadcasts have been disclosed. Software written according to the present invention may be stored in some form of computer-readable medium, such as memory or CD-ROM, or transmitted over a network, and executed by a processor. Additionally, where methods have been disclosed, various sequences of steps may be possible, and it may be possible to perform such steps simultaneously, without departing from the scope of the invention.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
   receiving media content item comprising visual content and a plurality of audio perspectives over a communication connection;
   recording, to a data storage device, at least some of the media content item, including at least portions of each of the visual content and the plurality of audio perspectives, as the media content item is received;
   providing the visual content with a first one of the plurality of audio perspectives for presentation to a user as the media content item is received;
   receiving a first user command to switch to a second one of the plurality of audio perspectives for presentation to the user, the first one of the plurality of audio perspectives comprising a first audio stream exhibiting a first spoken language and the second one of the plurality of audio perspectives comprises a second audio stream exhibiting a second spoken language different from the first spoken language;
   providing, in response to the first user command, the visual content along with the second one of the plurality of audio perspectives for presentation to the user;
   receiving, after the first user command, a second user command to re-play a portion of the media content item previously presented to the user; and
   providing, in response to the second user command, using at least one processor of a machine, the visual content and the second one of the plurality of audio perspectives of the portion of the media content item from the data storage device for presentation to the user.

2. The method of claim 1, wherein the communication connection comprises a television broadcast channel.

3. The method of claim 1, wherein the communication connection comprises the Internet.

4. The method of claim 1, wherein the communication connection comprises a cellular network.

5. The method of claim 1, wherein the recording of the at least some of the media content item comprises storing the at least some of the media content item to a circular buffer of the data storage device.

6. The method of claim 1, wherein the recording of the at least some of the media content item occurs in response to a user selection of the media content item for viewing.

7. The method of claim 1, wherein the recording of the at least some of the media content item occurs in response to the first user command.

8. The method of claim 1, wherein the recording of the at least some of the media content item comprises recording an entirety of the media content item.

9. The method of claim 1, wherein the first user command comprises a menu selection to switch to the second one of the plurality of audio perspectives while continuing to provide the visual content for presentation to the user.

10. The method of claim 1, wherein the second user command comprises a rewind command followed by a play command.

11. A non-transitory computer-readable storage medium comprising instructions that, when executed by at least one processor of a machine; cause the machine to perform operations comprising:
 receiving a media content item comprising visual content and a plurality of audio perspectives over a communication connection;
 recording, to a data storage device, at least some of the media content item; including at least portions of each of the visual content and the plurality of audio perspectives, as the media content item is received;
 providing the visual content with a first one of the plurality of audio perspectives for presentation to a user as the media content item is received;
 receiving a first user command to switch to a second one of the plurality of audio perspectives for presentation to the user, the first one of the plurality of audio perspectives comprising a first audio stream exhibiting a first spoken language and the second one of the plurality of audio perspectives comprises a second audio stream exhibiting a second spoken language different from the first spoken language;
 providing, in response to the first user command, the visual content along with the second one of the plurality of audio perspectives for presentation to the user;
 receiving, after the first user command, a second user command to re-play a portion of the media content item previously presented to the user; and
 providing, in response to the second user command, the visual content and the second one of the plurality of audio perspectives of the portion of the media content item from the data storage device for presentation to the user.

12. The non-transitory computer-readable storage medium of claim 11, wherein the communication connection comprises a television broadcast channel.

13. The non-transitory computer-readable storage medium of claim 11, wherein the communication connection comprises the Internet.

14. The non-transitory computer-readable storage medium of claim 11, wherein the communication connection comprises a cellular network.

15. A media content system comprising:
 a data storage device configured to store at least some of a media content item comprising visual content and a plurality of audio perspectives;
 a front end configured to receive the media content item over a communication connection;
 a control processor configured to receive user commands; and
 a transport stage configured to
  record, to the data storage device, the at least some of the media content item, including at least portions of each of the visual content and the plurality of audio perspectives, as the media content item is received via the front end;
  provide the visual content with a first one of the plurality of audio perspectives for presentation to a user as the media content item is received via the front end;
  receive a first user command via the control processor to switch to a second one of the plurality of audio perspectives for presentation to the user, the first one of the plurality of audio perspectives comprising a first audio stream exhibiting a first spoken language and the second one of the plurality of audio perspectives comprises a second audio stream exhibiting a second spoken language different from the first spoken language;
  provide, in response to the first user command, the visual content along with the second one of the plurality of audio perspectives for presentation to the user;
  receive, after the first user command, a second user command via the control processor to re-play a portion of the media content item previously presented to the user; and
  provide, in response to the second user command, the visual content and the second one of the plurality of audio perspectives of the portion of the media content item from the data storage device for presentation to the user.

16. The media content system of claim 15, wherein the communication connection comprises at least one of a broadcast television channel, the Internet, and a cellular network.

17. The media content system of claim 15, wherein the data storage device comprises a circular buffer to which the at least some of the media content item is recorded, and wherein the recording of the at least some of media content item to the circular buffer overwrites previously recorded media content.

18. The media content system of claim 15, further comprising a set-top box that includes the front end, the control processor, and the transport stage.

19. The media content system of claim 18, wherein the set-top box further comprises the data storage device.

* * * * *

UNITED STATES PATENT AND TRADEMARK OFFICE
CERTIFICATE OF CORRECTION

PATENT NO. : 9,525,839 B2  
APPLICATION NO. : 14/479077  
DATED : December 20, 2016  
INVENTOR(S) : Hensgen et al.

Page 1 of 1

It is certified that error appears in the above-identified patent and that said Letters Patent is hereby corrected as shown below:

In the Claims

In Column 13, Line 17, in Claim 11, delete "machine;" and insert --machine,--, therefor In Column 13, Line 23, in Claim 11, delete "item;" and insert --item,--, therefor Signed and Sealed this  
Ninth Day of January, 2018

Joseph Matal  
*Performing the Functions and Duties of the*  
*Under Secretary of Commerce for Intellectual Property and*  
*Director of the United States Patent and Trademark Office*